Dec. 10, 1940.  H. R. DE SILVA  2,224,564
APPARATUS FOR ASCERTAINING VISION SENSITIVITIES
Filed June 22, 1938   5 Sheets-Sheet 1

INVENTOR
Harry R. De Silva
BY Watson, Bristol, Johnson & Leavenworth
ATTORNEYS

Dec. 10, 1940.   H. R. DE SILVA   2,224,564
APPARATUS FOR ASCERTAINING VISION SENSITIVITIES
Filed June 22, 1938   5 Sheets-Sheet 2
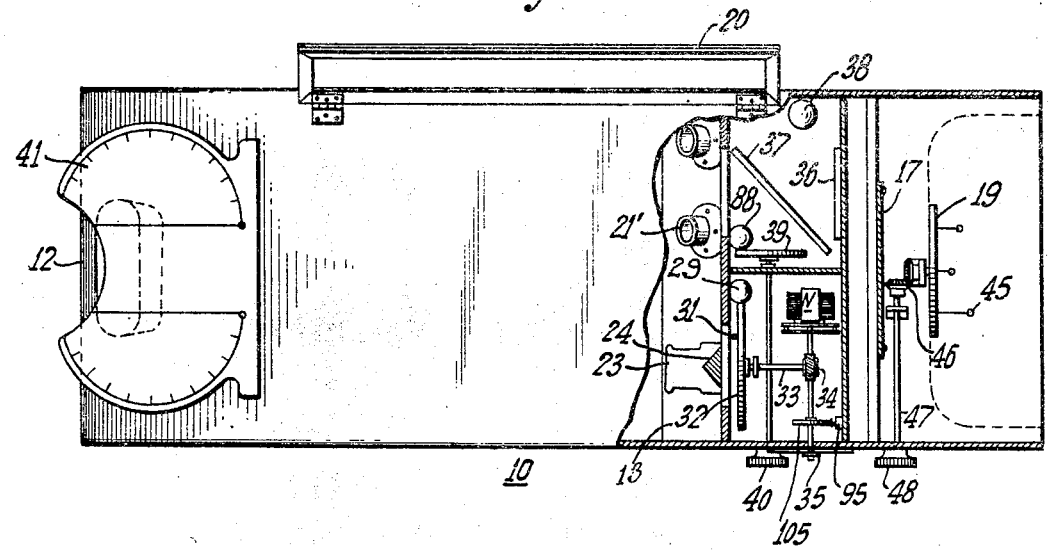
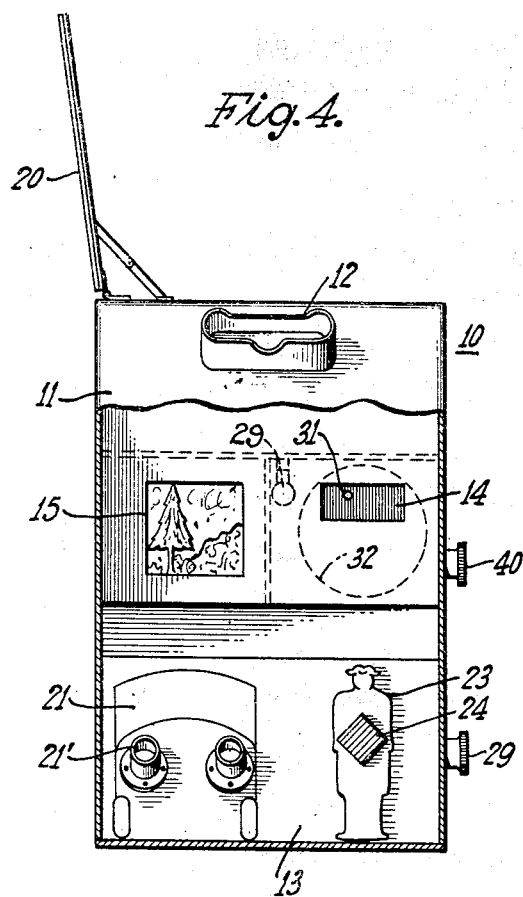
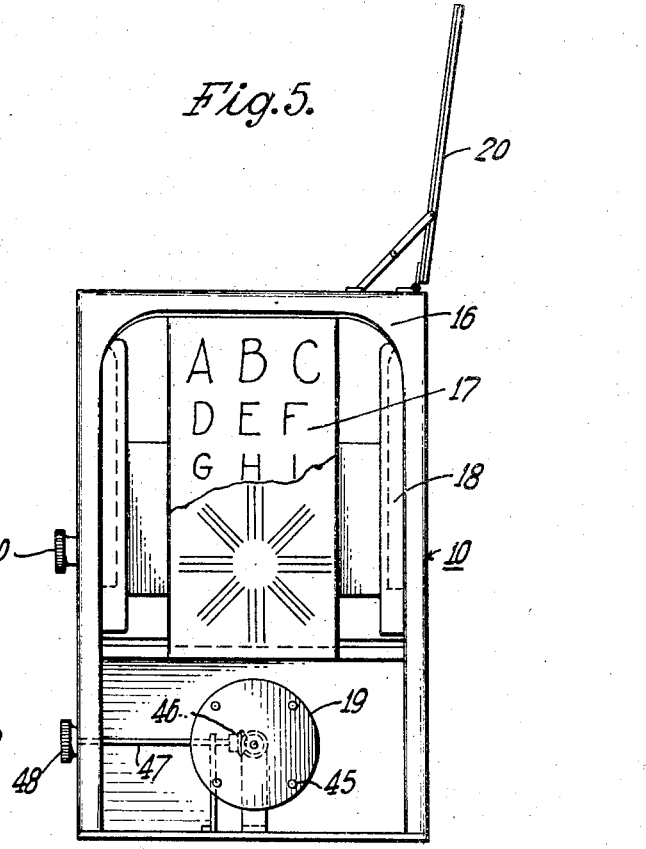

INVENTOR
Harry R. De Silva
BY Watson, Bristol, Johnson & Leavenworth
ATTORNEYS

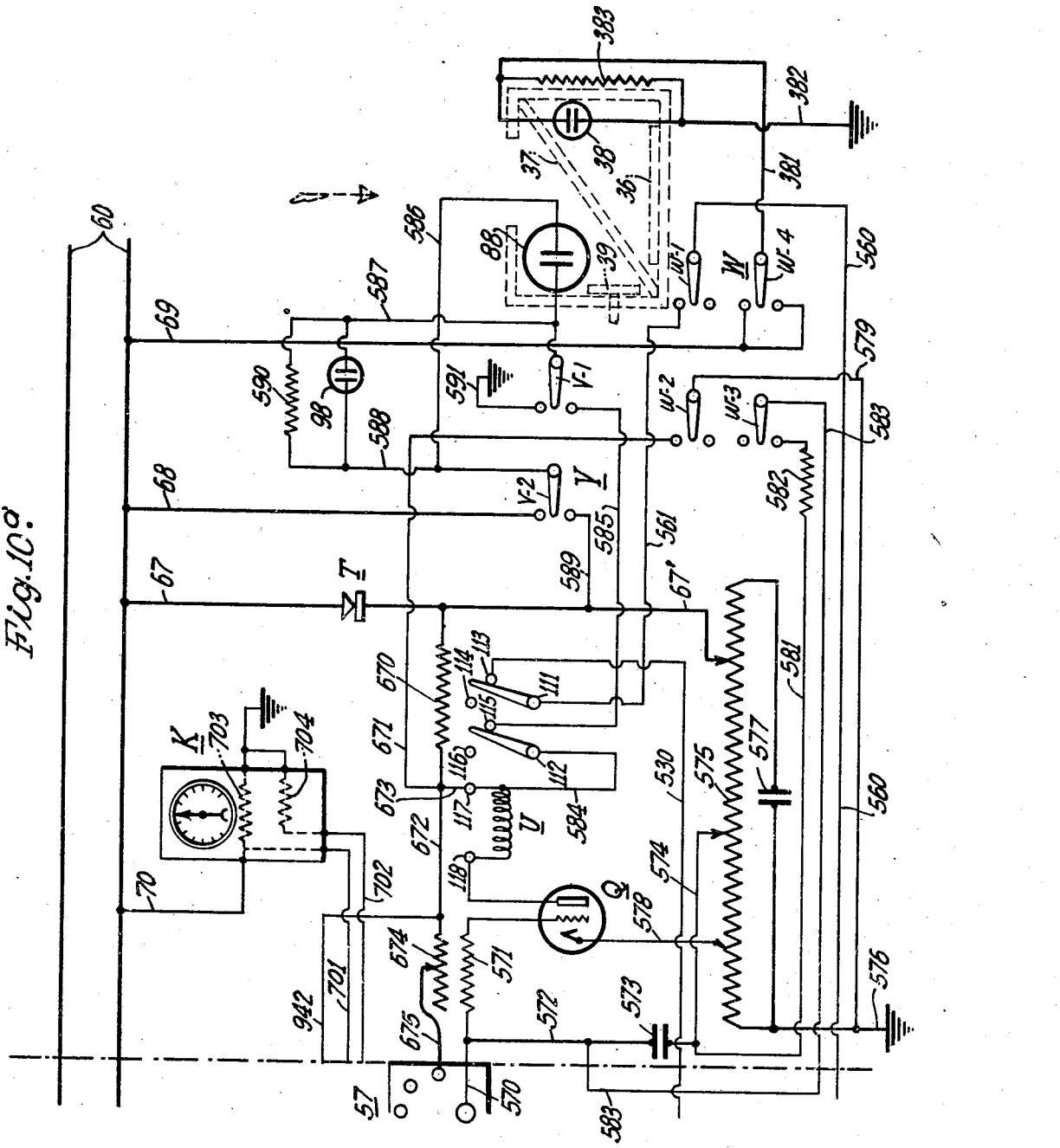

Patented Dec. 10, 1940

2,224,564

UNITED STATES PATENT OFFICE 2,224,564

APPARATUS FOR ASCERTAINING VISION SENSITIVITIES

Harry R. De Silva, Cambridge, Mass.

Application June 22, 1938, Serial No. 215,198

14 Claims. (Cl. 35—22)

This invention relates to apparatus for ascertaining vision sensitivities of a human being.

More specifically, the invention relates to a method and apparatus for ascertaining one or more vision sensitivities which are ordinarily employed when one operates a motor vehicle on a public highway.

The invention has for its object generally the provision of procedural steps, together with suitable apparatus, for testing a subject for the vision sensitivities desired to be ascertained.

More specifically, the invention has for its object the provision of a combination of procedural steps together with coordinated instrumentalities for ascertaining one or more of the vision sensitivities which it is desired to ascertain of one who may operate a motor vehicle.

Another object is to provide procedural steps and coordinated instrumentalities adapted for determining a desired set of different vision sensitivities of an operator of a motor vehicle on a public highway which may be involved in both day and night driving.

Another object is to provide procedural steps and coordinated instrumentalities for determining the vision sensitivities of an operator of a motor vehicle on a public highway at night, such as glare blindness and glare recovery.

Another object is to provide procedural steps and coordinated instrumentalities for ascertaining a subject's general visual efficiency, such as visual keenness, speed of perception, sensitivity to motion, and depth perception.

Another object is to provide apparatus for testing and registering with precision the vision sensitivities of operators of motor vehicles which is of a character that may be installed in a testing device, such as a cabinet, and includes equipment arranged in a compact and convenient manner for giving a desired set of tests for ascertaining vision sensitivities, such equipment being either conventional or specially devised.

Still another object is to provide testing apparatus of the character indicated with an electric network which incorporates suitable circuits for coordinating measuring instruments with stimuli giving devices for registering and indicating the times of reaction to certain road conditions involving vision sensitivies and reaction by operators of motor vehicles.

Other objects of the invention will in part be obvious and will in part appear hereinafter.

The invention accordingly comprises the features of construction, combination of elements, and arrangement of parts, which will be exemplified in the construction hereinatfer set forth, and the scope of the invention will be indicated in the claims.

For a fuller understanding of the nature and objects of the invention, reference should be had to the following detailed description taken in connection with the accompanying drawings, in which:

Fig. 3 is a top plan view, part of the casing being shown broken away, in order to illustrate details of the interior construction;

Fig. 4 is an end elevational view of the apparatus, a portion of the end wall being broken away, in order to show other interior constructional details;

Fig. 5 is an end elevational view of the apparatus seen from the end other than that shown in Fig. 4;

Figs. 10 and 10a are diagrammatic views of an exemplary electric network, and an extension thereof, provided in accordance with the invention.

Figure 1:
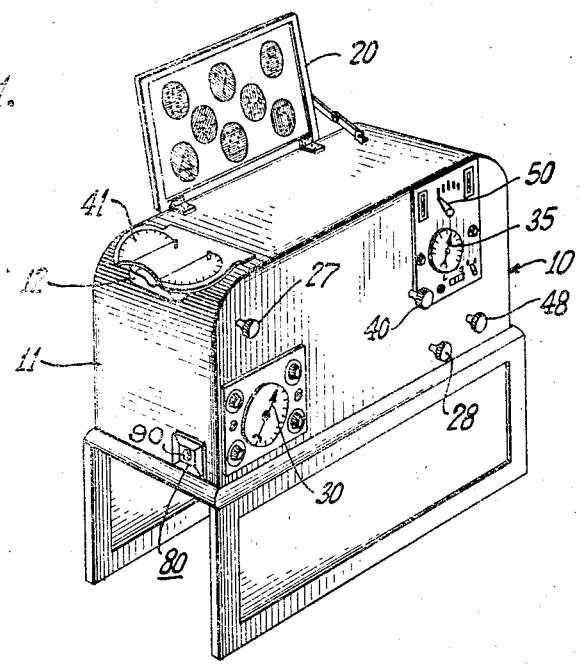
Fig. 1 is a view, mainly perspective, showing a cabinet incorporating a plurality of means for testing the vision of subjects, particularly those who may operate motor vehicles, according to the invention.

In order to ascertain clinically, as proposed by the invention, a desired group of vision sensitivities of a subject, particularly those deemed ordinarily employed when operating a motor vehicle under conditions encountered in both day and night driving, the subject is submitted to artificial conditions simulating a suitable field of vision, such as that encountered when driving on a highway, and appropriate stimuli for vision reactions applied.

The clinical procedure involves generally, as a first procedural step, submitting the subpect to the artificial conditions which would call into play a desired vision sensitivity of a subject, such as when operating a motor vehicle on a highway. As a second procedural step, one or more controllable stimuli are generated for appropriate periods in a manner that may be visually perceived by the subject. The third procedural step involves registering for the exclusive use of one giving the test (hereinafter referred to as the "tester") by means of an automatically set index on the control means the intensity of a stimulus given. Where time intervals are the index means one registers the instants of starting and stopping the stimulus whereby the intervening period of time becomes the measure of the sensitivities involved The procedural steps above described are advantageously administered by means of suitable apparatus providing the artificial conditions, which apparatus may be conveniently in the form of a cabinet adapted to be stationarily installed in a laboratory or testing room and before which the subject is seated for testing. To this end, suitable devices for simulating the driving conditions and giving the stimuli desired are incorported in the apparatus. For example, a road scene may be simulated and a stimulus, such as a signal light, flashed for variable periods until the subject indicates that he (or she) has perceived the stimulus.

Such apparatus may be provided with means specifically adapted to give stimuli for practicing procedural testing steps whereby the following vision sensitivities may be ascertained:

1. Glare blindness;
2. Glare recovery;
3. Movement sensitivity;
4. Speed of perception;
5. Tunnel vision;
6. Visual coordination;
7. Depth perception;
8. Visual keenness;
9. Astigmatism; and
10. Color sensitivity.

To ascertain the glare blindness of a subject when driving at night, he is submitted to an artificial scene simulating driving conditions on a road at night. A stimulus is then given, in which an object is made to appear on the road scene, with conditioning lights of a predetermined intensity projecting into the subject's eyes, simulating, for example, a truck with glaring headlights. Another object, preferably having directional markings thereon, which the subject is told to watch for, is then illuminated with light of an intensity which may be varied. The illumination employed may be initially of a relatively low value and is gradually increased, or it may be initially of a high value and gradually decreased until the subject can no longer see it. In the first case, the subject is instructed by the tester to signal when he perceives the position of the lines on the object; in the second, he signals when he can no longer see them. The increase in the illumination required for the subject to overcome his blindness is a measure of the subject's glare blindness.

To ascertain a subject's rate of recovery from glare when driving at night, he is again submitted to an artificial road scene when an object with lights of predetermined intensity, such as an object simulating a truck with glaring headlights, is made to appear for a predetermined period and then to disappear. The subject is again instructed to look for a dim object which simulates a pedestrian and requested to inform the tester when he can discern the direction of the markings on the pedestrian. Here, the object has a constant predetermined illumination. The period of time required for the subject to perceive the object is a measure of his rate of recovery from the glaring light initially given.

In order to ascertain a subject's sensitivity to movement, he is submitted to a scene containing a small object that is moved laterally at a very slow rate. The subject is instructed to watch it until he notices how the object moves and then give a signal and tell the tester the direction of the motion which he perceived. The reciprocal of the period of time taken by the subject to determine the direction of movement may be taken as a measure of his movement sensitivity.

To ascertain a subject's speed of perception, the subject is submitted to another scene, for example, a landscape of the character appearing on a highway, and told to watch for the appearance of a marked object, such as a pedestrian or animal, which may appear somewhere in the scene. To generate this apparition, a suitable light source is flashed for a varying interval of time to illuminate the scene and object, the latter being conveniently provided as a reflection from a transparency over the scene. The interval is varied by the tester and is not to be longer than needed by the subject to get an impression on his retina. The subject is told to register as soon as he perceives the object by giving a signal. Such flash may begin with intervals as short, for example, as 0.001 of a second which are gradually increased until the subject signals that he has perceived the object. The duration of the perceived signal may be taken as a measure of the subject's speed of perception.

To ascertain a subject's so-called "tunnel vision," the subject is tested for sensitivity to an object out of the direct line of vision which may be moved through varying angles at the sides of the subject's eyes. The reciprocal of the angle of displacement from the direct line of vision may be taken as a measure of the subject's tunnel vision.

To ascertain the subject's visual coordination, the vision of each eye is examined separately. To this end, the subject is made to look at a point source of light. A Maddox rod, or other device of the character employed by oculists and opticians for this purpose, is rotated in front of the subject's eyes. The degrees of lateral or vertical imbalance may be measured in terms of degrees of displacement or separation, of the light source as viewed binocularly.

To ascertain a subject's judgment in perceiving depth, while seated at various distances, he is requested to pass judgment on the distances from him of small objects in a judgment testing device which preferably comprises a rotatable disk mounted to turn about a horizontal axis and has distinguishable objects thereon supported at varying distances therefrom. The subject is told to name them in the order of nearness. The percentage of correct judgments may be taken as a measure of the subject's ability to judge depth.

To ascertain a subjects' visual keenness, he is seated before a chart bearing rows of figures or letters of graded sizes, such as are commonly used by oculists and opticians, and asked to read the successively smaller rows from various distances starting with the greatest distance, which may be, for example, 40 feet. The several scores may be taken as a measure of keenness.

As a further test for visual keenness, the two eyes may be tested separately. To this end, the subject may be tested by putting on him a pair of glasses whose right lens contains material to polarize all light transmitted in a vertical plane, while the left lens transmits light polarized in a horizontal plane. The tester holds a large sheet of polarizing material in front of the chart bearing the rows of figures. By rotating the sheet the tester can make the subject see respectively first with his right and then with his left eye. The use of the polarizing material has the advantage of testing the right and left eyes separately without the subject knowing which eye is tested and without subjecting either eye to the disturbing effect of covering one eye.

To ascertain astigmatic defects in a subject's vision, he is instructed to read a standard chart of the character ordinarily employed by oculists and opticians for this purpose. The direction of blurred lines noted by the subject indicates the astigmatic error of the subject's eyes.

To ascertain a subject's color sensitivity, standard charts in colors are submitted, color blindness being detected by means of colored images made of small dots or circles and disposed like the elements of a mosaic in a background of a different color. On some charts, the figures or images are such that only the color-normal persons can perceive them, while in other charts the figures or images are such that only a color-blind person will see them. The charts read are thus an index of the subject's ability to distinguish color.

Referring now to the drawings, and particularly to Figs. 1 to 5, a cabinet is shown at 10 which preferably has one end closed, such end being denoted 11. The cabinet has lenses in a suitable eye-shield 12 disposed at the closed end for viewing one or more scenes that are arranged within the cabinet. Such scenes are conveniently provided in association with screens, designated 13, 14, and 15, respectively. These screens are mounted on a partition in the cabinet and may be viewed by a subject seated outside the cabinet, when the screens are properly illuminated from within. By such means, an illusion is given, simulating driving under day or night conditions, as the case may be, in a manner which it is desired to apply to the subject for test purposes.

The other end 16 of the cabinet is preferably open and has disposed in it one or more charts 17 that have standard optician's testing markings thereon, for example, graded figures and/or line groups of the kind employed for testing for astigmatism. Suitable luminary lamps 18 are preferably mounted at the sides of this end for illuminating the charts when desired.

The space at the open end of the cabinet not occupied by the charts may advantageously be utilized to accommodate some other testing device, for example, a depth perception testing device which has background disk 19 that may be disposed below and in front of the chart 17. On top of the cabinet, in a suitable frame 20, is another oculist's testing chart, such, for example, as a standard color testing chart.

To equip the apparatus to make glare blindness and glare recovery tests, the screen 13 is preferably arranged to simulate conditions when driving on a highway at night, and has one or more objects arranged to be illuminated with varying amounts of light. To this end, a truck is depicted at 21 on the screen, which is provided with openings 21' having light projecting lamps 22 disposed behind them so as to simulate the headlights of the truck. Adjacent the object 21 is a second object 23 arranged to simulate a different form, for example, a human form. This form is provided with a rotatable element 24 carrying contrasting directional markings, such as lines. An illuminating means, simulating the subject's headlights, is disposed in the cabinet, and advantageously has the form of a light projector 25 that has an adjustable light stop disk or lens carrier 25' and a lamp 26, connected in an electric circuit supplying current in a manner hereinafter described. A knob 27 on the exterior of the cabinet has mechanical connections for rotating the disk 25' at will. A similar knob 28 on a shaft 28' is also provided for rotating the element 24 at will.

Figure 6:
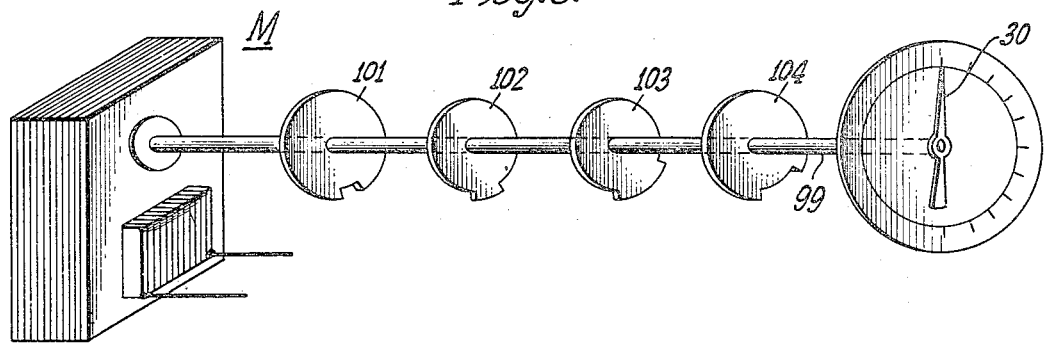
Fig. 6 is a perspective view of an electric motor assembly employed for timing visual reactions, indicating the period required for recovery from certain conditions and determining the period of the test.

To measure the time required by the subject to recover from glare, the cabinet is preferably provided with suitable timing means, for example, a timing device having an indicating hand 30 driven by a suitable motor, such motor being also preferably arranged to control the circuits which supply illuminating current to the lamps 22 and 26. A relatively slow synchronous motor may be employed for this purpose, such as a 3 R. P. M. single-phase synchronous motor, shown at M, in Fig. 6. The circuits which are automatically controlled by the motor M are described more fully hereinafter. The hand 30 is conveniently disposed to turn about a dial mounted on a side of the cabinet, which also may conveniently have dials for rheostats for controlling the current of the lamps 22 and 26.

To equip the apparatus to make movement sensitivity tests, screen 14, which is advantageously arranged above the screen 13 so as to be viewed by the subject merely by raising his eyes, is provided with an opening through which is seen an object, such as a small white body 31, to which is given a slow lateral movement. To achieve such movement, the body 31 is mounted on a slowly moving carrier disk 32 that is preferably dark in color and is mounted for rotation on a shaft 33 driven through worm gearing 34 by means of a reversible motor N. Any suitable reversible A. C.-motor may be employed. A reversible five-wire motor is convenient and is in the form shown in Figs. 7, 8, and 10. To indicate clearly to the tester the direction of motion being imparted to the body 31, the motor shaft is preferably extended through the casing and has an indicating hand 35, shown in Figs. 1 and 7. To illuminate the body 31 a small lamp 29 is provided.

To equip the apparatus to make a test for ascertaining the subject's speed of perception, a tachistoscope is provided in association with the screen 15, which latter may be also above screen 13 and adjacent to the screen 14. Screen 15 has an opening through which a scene on a background plaque 36 is visible through an obliquely disposed transparent member 37. The scene is illuminated by means of a lamp 38 placed behind a margin of the screen out of the range of the subject's vision. The object, for which the subject is to watch, may be made to appear on the scene at 36 in random positions by means of an image on a rotatable disk 39, mounted so as to have its reflections projected by the member 37 into the subject's eyes. The position of the image is controlled by the disk 39 which is accordingly arranged for manipulation by the tester from without the cabinet by means of a knob 40, as shown in Figs. 3 to 5. In this arrangement, a second lamp 88 is provided to illuminate the image for short periods, which may begin, for example, with periods of 0.001 of a second and then lengthened at will. The timing of this illumination is preferably automatically controlled by suitable electric timing means connected in a circuit hereinafter described.

To equip the apparatus to make a test for tunnel vision, a protractor board 41 is associated with the cabinet at a convenient point, for example, adjacent to the eye-shield so that the subject when tested therefor is required but to raise his head to look at the fixation points, one for the left eye and one for the right eye, located on the protractor board. The protractor board is graduated with arcs at the sides to read angular degrees whereby sensitivity to an object moved by the tester about the periphery of the arcs to various positions not in the line of vision may be determined and the object's position read in degrees of angular displacement from such line by means of the scales marked on the protractor board.

Figure 2:
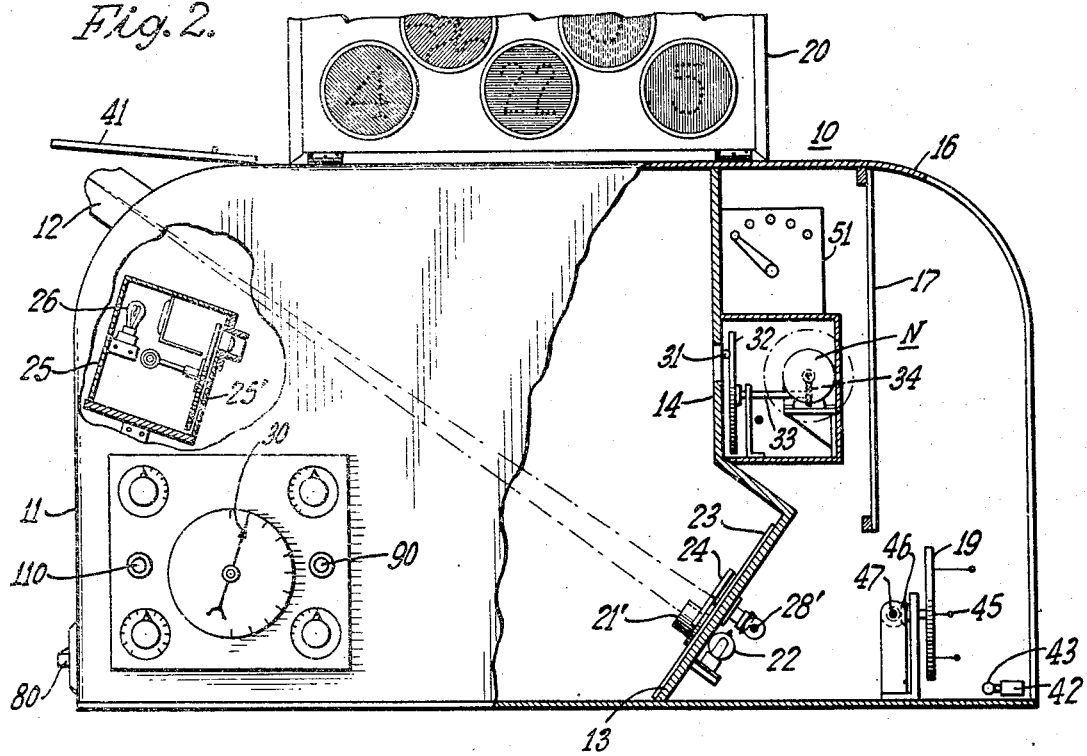
Fig. 2 is a side elevational view of the apparatus, shown in Fig. 1, parts being broken away in order to illustrate constructional details thereof.

To equip the apparatus to make tests for visual coordination, a Maddox rod, suitably mounted for use, for example, in a casing 42, is provided and associated with the cabinet at a convenient point, and may have a mounting bar 43, all as shown in Fig. 2. Such Maddox rod is, of course, used in the manner well known in the art. The source of light for this test may be provided in the cabinet, or exteriorly when convenient.

To equip the apparatus for making tests for depth perception, the movable disk 19 at the other end of the casing has a plurality of objects which may be in the form of large-headed pins 45 inserted therein and projecting therefrom at varying distances. These objects are arranged to be viewed by the subject when seated at various distances from the cabinet and may be labeled to distinguish them so as to be read in the light of the room where the test is being conducted. To vary the test, the disk 19 carrying the pins 45 is arranged to be rotated at will by the tester. To this end, gearing 46 is provided to rotate the disk, the gearing being arranged for manual manipulation through a shaft 47 having a knob 48 on the exterior of the cabinet.

To equip the apparatus to make tests for visual keenness, astigmatism, and color sensitivity, charts are provided respectively at 17 and 20, which are preferably the standard charts used for this purpose, as previously indicated. Where polarized light is to be employed in making the test, a suitable pair of glasses or frames would also be provided in the cabinet together with a suitable screen or filter of polarizing material.

To enable the several lamps here provided to have their illumination properly controlled for the several tests to be given, and to enable the motors to operate automatically in conjunction with the lamps, a network is provided, in which a plurality of circuits may be selectively set up at will to make the several tests. This selective setting up of circuits is preferably accomplished by a manually operated switching device. Any suitable manually operated multi-circuit controlling switch may be employed, for example, a gang-switch having a plurality of operating positions and a manipulating handle 50, which is preferably mounted on a panel on the exterior of the cabinet for movement by the tester.

Figure 10:
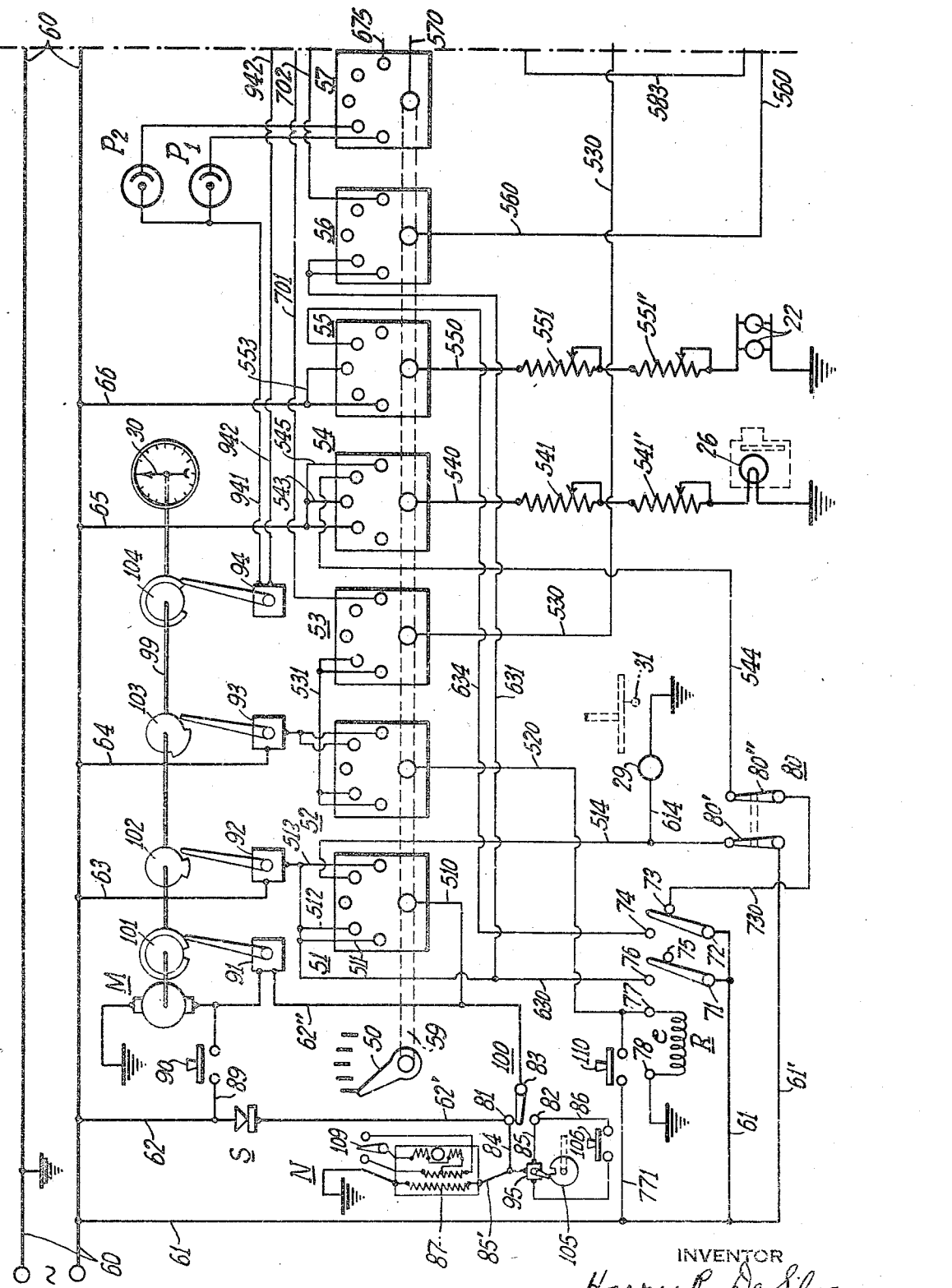

A suitable network having circuits selectively set up by means of gang-switch handle 50 is shown in Figs. 10 and 10a. Here, the gang-switch is depicted as being a five-position gang-switch composed of seven plaques denoted respectively 51 to 57, which have terminals from which the several circuit connections lead. These terminals are simultaneously swept by the seven contact arms (not shown in the drawing in the interests of clearness of illustration), the arms being ganged together for effecting such movement by means of a shaft 59 that is turned by handle 50.

The network here provided is preferably supplied with alternating current in order to run timing devices. To this end, a pair of A. C. supply buses is shown at 60, one of which is tapped by means of a plurality of device supplying or trunking conductors denoted respectively 61 to 70, the return from the devices being effected in any convenient manner, for example, through ground, as illustrated in the drawings (the other supply bus being shown as grounded for this purpose).

Trunking conductor 61 is shown as leading to a pair of contact arms of a relay, shown generally at R. Any suitable relay may be employed, for example, a double-armed eight-terminal relay whose terminals are designated 71 to 78 in the drawings. The contact arms are shown pivoted respectively at 71 and 72 and are connected in parallel to the conductor 61. The contact arms are moved by the winding e connected across terminals 77 and 78 when energized, the arms swinging away from the terminals 73 and 75 into engagement with the terminals 74 and 76. Current to energize the relay is normally supplied to the terminal 77 by means of a conductor 520 leading from the contact arm terminal of the plaque 52. The return from the relay leads from terminal 78 to ground. A by-pass for energizing the relay at will is also provided in the form of a conductor 771 leading from the trunking conductor 61 to the terminal 77 which is normally open but closed by a push-button switch 110, this latter being conveniently mounted on the cabinet for manipulation by the tester. A parallel branch of the trunking conductor 61, designated 61', leads to one blade 80' of a double-pole switch, indicated generally at 80, which is normally closed but arranged on the cabinet at a convenient point for manipulation by the subject being tested. Blade 80' when closed engages the terminal of a conductor 514 that leads to the fourth terminal on plaque 51. A parallel branch 614 is also tapped in to the conductor 514 for supplying current to lamp 29, disposed in the cabinet for illuminating object 31, the return from which is grounded. The other blade 80" of the switch 80 is connected by a conductor 730 to terminal 73 of the relay, the blade 80" when closed engaging the terminal of a conductor 544 that leads to the fourth contact terminal of plaque 54.

Trunking conductor 62 is arranged to supply a unilateral or D. C. component of current to motor M. It hence has in series with it a rectifying device, shown generally at S. From the rectifying device the circuit continues as conductor 62' leading to terminal 81 of a circuit changing switch, shown generally at 100. This latter has in addition terminals 82 and 83, the switch blade being pivoted to terminal 83. From terminal 83 the circuit is continued as conductor 82" to a terminal of motor M, the return for which is grounded. Inserted in the circuit in series with the switch and motor is a suitable automatic motor controlling switch 91, such, for example, as a cam-actuated commutator switch, suitable constructional details for such switch being shown in Fig. 9. Alternating current for running the motor is supplied to conductor 62" by way of conductor 910. In order that the motor M may be started at will by the tester, a by-pass about the switch 91 is provided in the form of a conductor 89 which is connected between conductor 62 and a terminal of the motor M, the connection being normally open but arranged to be closed by a push-button switch 90 that is in series with the connection but in parallel with the switch 91.

Other commutator switches are shown at 92 to 94 respectively and connected in circuits, as hereinafter explained. Switches 91 to 94 are operated by cams, denoted 101 to 104, respectively, the cams being advantageously disposed on a shaft 99 that extends from motor M to turn hand 30. Cam 101 actuates the operating arm of switch 91, the cam having an engaging periphery that moves the arm into circuit closing position. A notch in the periphery is provided into which the arm drops at the end of one revolution to open the motor circuit automatically. Cam 101, in consequence, is hereinafter referred to as the "motor cam."

Figure 7:
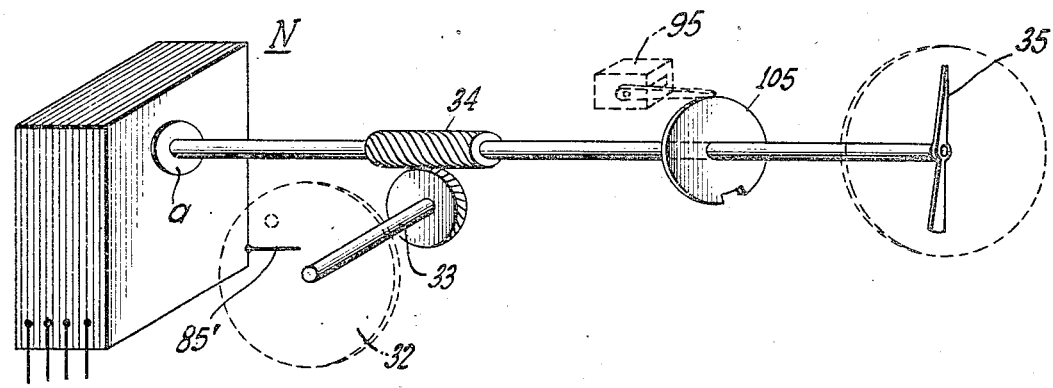
Fig. 7 is a view showing another electric motor assembly, employed for testing for motion sensitivity.

To supply unilateral or pulsating D. C. current to the motor N, a conductor 84 is connected from the terminal 81, which is connected with rectifier S, to one terminal of the field winding 87 of the motor N. From terminal 82 of this switch a second conductor 85 leads to one terminal of another commutator switch 95 whose other terminal is also connected to the adjacent terminal of winding 87 by way of conductor 85'. This commutator switch is actuated by means of a cam 105 of the shaft driven by motor N, as shown in Fig. 7. Another by-pass conductor 86 for starting purposes is connected between terminal 82 and conductor 85', this connection being normally open but closed by a push-button switch 106. Thus, it is seen that motor N may be started by the tester by depressing switch 106, which is in parallel with the commutator switch 95.

Figure 8:
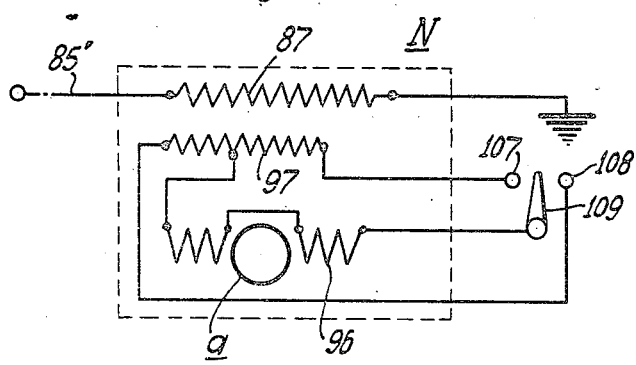
Fig. 8 is a view, mainly diagrammatic, showing the wiring arrangement of the motor of Fig. 7.

The circuits in the motor N are diagrammatically illustrated in Fig. 8 where it is seen that the field winding 87 is arranged as the primary of a transformer and has a secondary 97 whose terminals are connected respectively to terminals 107 and 108 of a reversing switch whose blade 109 is connected to one terminal of shading windings 96 of the motor. The other end of the shading windings is connected to the mid-point of the secondary winding 97. By this arrangement, when switch 100 is in "down-position," the field winding 87 may be energized with alternating current supply by conductor 85, the rectifier S being short circuited. Alternating current displaced in phase is also supplied to winding 96 in one direction or the other, depending on whether the blade 109 engages with terminal 107 or with terminal 108, such directional phase displaced current being had from one or the other of the two halves of secondary winding 97 which are thus connected to impart a starting direction to the motor rotor. The supply of running alternating current for the motor is had through the circuit comprising conductors 61, 61', 80', 514, and 510, and thence through switch 100, terminal 82, conductor 85, switch 95 when closed, conductor 85', and winding 87 which is grounded. If this circuit be interrupted, as by opening switch 80, the short around rectifier S is removed and a D. C. component of current passes in the circuit comprising conductor 62, rectifier S, terminal 81, and conductors 84 and 85' to winding 87 which is grounded. This component operates to effect the dynamic braking of motor N and avoid so-called "overshooting."

Trunking conductor 63 leads to one terminal of the second operated commutator switch 92, whose other terminal has a plurality of parallel connections, namely, 511, 512, and 513, leading respectively to the first, second, and fifth terminals on plaque 51, there being also a fourth conductor 630 leading to terminal 76 of the relay R. Conductor 510 leads from the contact arm terminal of plaque 51 to a point on conductor 62" in order to supply current for running motor M. A conductor 631 is connected to conductor 630 and leads through parallel branches to the first and second terminals respectively on plaque 56. Another conductor 634 is also connected between terminal 74 of the relay and the fourth terminal on plaque 55. A conductor 560 leads from the contact arm terminal of plaque 56 to one of the switch blades w—1 of a four-bladed double-throw switch, shown generally at W. From one terminal of the switch that is engaged by blade w—1 when in up-position, a conductor 561 is led to a contact arm terminal 111 of another relay, shown generally at U, which preferably has eight terminals, denoted respectively 111 to 118, and may in general be like that shown at R. Here, the contact arms are pivoted respectively to the terminals 111 and 112 and swing away from terminals 113 and 115 into engagement respectively with terminals 114 and 116, both of which latter are unconnected in the present network, the actuating winding being connected across terminals 117 and 118. The contact arm terminal at 111, when the relay is unenergized, engages terminal 113 to supply current to conductor 530 which leads therefrom to the contact arm terminal of plaque 53. The first and second terminals of the latter are connected by way of a common conductor 531 to the first and second terminals of the plaque 52 which when engaged by the contact arm of plaque 52 is seen to supply current for energizing the relay R. Thus, the cam 102 which actuates the commutator switch 92 has a relatively short extended periphery for holding switch 92 closed for relatively short periods, in the several operative positions of the contact arm on plaque 52, and is hence designated hereinafter the "hold-in cam."

Trunking conductor 64 leads to one terminal of a third commutator switch 93 whose other terminal is connected in parallel to the fourth and fifth terminals of plaque 52. Switch 93 is actuated by a third cam on shaft 99, namely, that at 103. This cam has an extended periphery of an arcuate length greater than that at 102 and is designed to supply current directly to energize the relay R through conductor 520 for a predetermined period for which it is desired to hold the relay R closed for light controlling purposes. This period has been empirically found to be about six seconds. Hence, the cam 103 is hereinafter designated the "six-second cam."

Trunking conductor 65 leads from the supply bus to the second terminal of plaque 54 and has branches 543 and 545 which lead in parallel to the third and fifth terminals respectively on plaque 54. Conductor 540 leads from the contact arm terminal of this plaque to the subject's light 26, the return from which is grounded. Conductor 540 is thus seen to be energized in the second, third, and fifth positions of the gang-switch and has in series with it elements of adjustable resistance shown respectively at 541 and 541'. Knobs and dials for varying and showing the values of these resistances are preferably provided in positions to be under the control of the tester.

Trunking conductor 66 leads from the supply bus to the first terminal on plaque 55 and has a connection 553 leading in parallel to the third terminal on the plaque 55. A conductor 550 leads from the contact arm terminal to supply current to the lamps 22 which provide the glaring lights, the return from which is grounded. Conductor 550 is thus energized from the trunking conductor in the first and third positions of the gang-switch and has in series with it adjustable resistances as indicated at 551 and 551', these resistances being likewise preferably provided with controlling knobs and dials on the cabinet, so that they may be manipulated by the tester as desired.

A fourth commutator switch is shown at 94 and actuated by a fourth cam 104 that is on the shaft 99 and because it operates a photocell may be called the "photocell cam." Cam 104 has an extended periphery of an arcuate length that is substantially the complement of the six-second cam, and is thus arranged to actuate the commutator switch 94 and hold the same closed for substantially the same period as switch 93 remains open. From the terminals of commutator switch 94 are led a pair of conductors 941 and 942. Conductor 941 has parallel connections to the anode elements of a pair of photocells designated P1 and P2 respectively. The cathode elements of these photocells are connected respectively to the first and second terminals of plaque 57. Conductor 942 leads to a terminal of conductor 672 that is connected to a suitable source of direct current E. M. F.

To provide a suitable source of D. C. potential in the network here employed which is substantially free from the discontinuities of rectified alternating current, a secondary source of direct current E. M. F. is provided. To this end, trunking conductor 67 is connected through a rectifier T and a conductor 67' with one end of a potential divider or resistance 575 whose other end is grounded, as shown at 576, the divider having associated means for storing a charge in the form of a condenser 577, which is connected across the divider 575.

This secondary source of E. M. F. is connected to conductor 672 by way of conductor 671, switch blade w—2 of switch W when in up-position, lamp 88, and conductor 579, which, while connected to ground, has a positive polarity when discharging through tube Q. To this end, the winding of relay U is also connected to this circuit by conductor 673 which leads from terminal 117. A high resistance leak 670 is also preferably connected from conductor 67' to the junction with conductor 672.

The energization of relay U is arranged to be automatically controlled. To this end, a suitable automatic control device is connected in the return from the relay to ground. While any suitable device of this character may be employed, it is preferred to employ a controlled electron discharge device capable of passing relatively large currents, such as a power-sized tube or triode. A suitable triode of this character is sold under the trade-name "Thyratron." Accordingly, tube Q is shown in the relay return having its plate element connected to the terminal 118 of the relay while its cathode is connected through conductor 578 with a tap on divider 575 adjacent the end connected to ground.

The grid element is connected through resistance 571 and conductor 570 with the contact arm on plaque 57 which selects the controlling agency, such as the intensity of light on the photocells.

To impress a suitable bias on the grid element of tube Q a conductor 572 is connected at one end to resistance 571 and at the other to one side of a condenser 573, the other side being connected by a conductor 574 to a point of suitable potential on the divider 575. To effect a time control of the firing of tube Q, the fifth terminal of plaque 57 is connected through a conductor 675 with a variable high resistance 674 which is connected to the secondary source of E. M. F. by way of conductor 672.

In the present network, it is also desirable to provide a by-pass about the grid condenser 573. To this end, a conductor 581 in parallel with the conductor 574 is provided, leading to a terminal engaged by the blade w—3 of the switch W when in down-position, and has in series with it a resistance 582. From the blade terminal a conductor 583 is led to connect with conductor 572 and one side of the grid condenser 573. A conductor 584 is connected between terminals 112 and 117 of the relay in order that the arm pivoted at 112 when the relay is unenergized may supply current through terminal 115 by way of a conductor 585 to a terminal engaged by blade v—1 in down-position of another switch V, which is two-bladed and has the terminal so engaged connected directly to one terminal of lamp 88 which illuminates disk 39. The other terminal of lamp 88 is connected by a conductor 586 to the other switch blade v—2, which, when in down-position, engages with a terminal connected by a conductor 589 to the conductor 67' for effecting a return through the divider 575. A pilot lamp 98 is also preferably provided in association with the lamp 88 and arranged to give a signal to the tester showing whether or not the lamp 88 is illuminated. Accordingly, the lamp 98 is connected in parallel with lamp 88 through a conductor 587 which leads from the terminal of the blade v—1 to one terminal of the lamp 98, the other side being connected by a conductor 588 to the terminal of blade v—2. A controlling resistance for the lamps 88 and 98 is also provided at 590, connected in parallel with the lamps.

Trunking conductor 68 is arranged to connect directly with the other terminal connected by blade v—2 when in up-position. In this position, current to illuminate the lamps 88 and 98 is supplied for trial purposes directly from the supply buses 60. Accordingly, the terminal engaged by the blade v—1 when in up-position is shown as connected by a conductor 591 directly to ground.

Trunking conductor 69 is shown as connected directly to both terminals engaged by blade w—4 of the switch W. From the terminal to which blade w—4 is pivoted, a conductor 381 is led to supply illuminating current to the lamp 38 which illuminates the background plaque 36 in the cabinet. The other side of the lamp 38 is connected by way of a conductor 382 to ground, a controlling resistance 383 being connected across the terminals of the lamp.

Trunking conductor 70 is shown as connected to one terminal of the running winding 703 of a clock K, the return from the winding 703 being grounded. The clock K is preferably of the so-called "stop-clock" variety and has a clutch winding 704, the return from which is also grounded. Current to energize this winding is provided by conductors 701 and 702, the former of which is tapped into the conductor 70 and leads to the fifth terminal of plaque 53. Conductor 702 leads from the fifth terminal of plaque 56 and is connected to the other end of clutch winding 704. By this arrangement, it is seen that the energization of the clutch winding 704 is under the control of the relay U, the conductors 701 and 702 having the contact arm pivoted at terminal 111 in series therewith for completing the circuit in the fifth position of the gang-switch by way of conductors 530 and 560.

Figure 9:
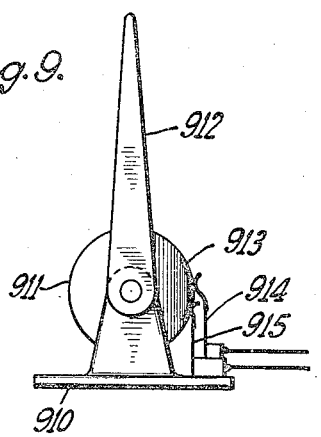
Fig. 9 is a perspective view showing details of a switching device advantageously employed in the network of the invention.

The construction of the commutator switch illustrated in Fig. 9 is seen to involve the provision of a base 910 which supports a revolvable insulating member 911 to which is secured an actuating arm 912. The member 911 has a conducting segment 913 on which bear contacting terminal members 914 and 915 arranged to be in simultaneous engagement for one position of the arm 912 and at least one of them out of engagement in another position. The arm 912 is, of course, biased to hold the contact member 913 normally in open circuit position and when actuated to move the same to a circuit closing position. A housing (not shown in the interests of clearness of illustration in the drawings) is preferably provided seating on the base and arranged to enclose the mechanism here shown.

Operation

In operation, the subject to be tested is seated adjacent the cabinet 10 so that he may look through the eye-shield at 12 in the first instance, and the procedural steps for testing his several vision sensitivities administered.

Preparatory to administering the tests for glare blindness and glare recovery, the subject's accommodation to the lights in the cabinet is ascertained and the light calibrated.

To make the first calibration, the gang-switch is moved to its first position, i. e., handle 50 is turned so that the contact arms on plaques 51 to 57 engage simultaneously with the first terminals on each of the same. In this position, it is seen that the glare lights at 22 are turned on by current supplied through the circuit comprising conductors 66 and 553, the contact arm of plaque 55, conductor 550, resistances 551 and 551' and lamps 22 which are grounded. Assuming now that it is desired to have the light from the lamps 22 of a predetermined value, for example, 30 foot-candles at the subject's eye, the light incident upon the photocell P1 will cause current to pass from secondary source of E. M. F. in the circuit comprising conductors 572, 942, 941, switch 94, photocell P1, the contact arm on plaque 57, conductors 570, 571, and 572, to feed a charge to the grid element of tube Q and condenser 573, as soon as switch 94 has been closed. To close switch 94, the tester presses momentarily the push-button switch 90 which starts the motor M. As soon as the motor starts the switches 91 to 94 are moved by their cams to closed positions, current for continuing the running of the motor being now supplied through the circuit comprising conductors 63, 513, 510, 62" and switch 91 to the terminal of motor M which is grounded. Current to actuate relay R also is supplied from conductor 63 through a circuit comprising conductors 630, 631, 560, blade w—1, 561, the arm at 111, conductors 530, 531, and 520, and thence to the winding e which is grounded. When the relay closes conductor 630 is energized directly from conductor 61. Switch 91 is now in control and keeps the motor M running. A D. C. component of current is also supplied through trunking conductor 62 and switch 100, when in up-position which is utilized when relay R opens to effect quick stoppage of the motor M without "overshooting."

When the relay R closes, the arm pivoted at 71 swings into engagement with terminal 76 to connect the conductor 630 directly to the trunking conductor 61. Thus, when the hold-in switch 92 opens, there is no change in the current supplied for running motor M. The steps of calibration are proceeded with after the switch 90 has been depressed, whether or not the switch 92 has yet opened. From the arrangement shown, it is seen that this grid of tube Q is maintained at a negative potential with respect to the cathode element by virtue of the voltage on the resistance 571, which serves as a current limiting element and is given a suitable value, for example, a value of about 10,000 ohms. In the circuit here provided, it is seen that for a 110 volt, 60 cycle source, the resistance 575 has across it approximately 150 D. C. volts as a result of the rectifier T which is in series with the source of alternating current.

When the switch W is in the up-position on the drawing, the relay circuit having the plate element of the tube Q in series with it has a positive potential applied thereacross. The plate current of the tube Q and hence that which energizes the relay U is of zero value until the grid fires the tube. This occurs when the intensity of the light is such as to cause the condenser 573 to be charged with sufficient positive potential to overcome the normal negative grid bias potential. When the tube fires, plate current is passed and continues to pass irrespective of the grid potential, energizing the relay U so as to swing the arms pivoted at 111 and 112 and break the current through conductors 560, 561, and 530. This deenergizes the relay R and stops motor M. To stop the passage of plate current in the tube Q, the plate or anode voltage supply connection must be opened. This is accomplished by moving blade w—2 to its neutral or down-position.

When relay R is deenergized, the contact arms pivoted at 71 and 72 open and interrupt the supply of current to the conductor 630 which is now the sole source of current to the motor M. The motor M stops, in consequence, the stoppage being quickened by the action of the D. C. component of current supplied through the device S. The strength of the current in photocell P1 determines the rate of charging of condenser 573 and hence the instant at which tube Q fires. The intensity of the lights at 22 on the photocell P1 may hence be determined from the travel of the hand 30 about its dial on the cabinet, the desired travel of the hand 30 for 30 foot-candles being known from previous laboratory calibration. In the event the hand 30 does not travel the desired distance but either fails short or goes past the mark, the resistances at 551 and 551' controlling lamps 22 may be adjusted until the desired light intensity is obtained.

To reset the apparatus for another test, the switch W is now thrown to its down-position. This is seen to discharge the condenser 573 through the circuit comprising conductors 583, switch blade w—3, resistance 582 and conductor 581 to the other side of the condenser. This discharge is seen to reset the potential on the grid of tube Q while the simultaneous opening of switch blade w—2 removes the potential from the plate of tube Q so that the passage of energizing current through relay U is stopped and the contact arms pivoted at 111 and 112 fall back to the open relay position, setting up a circuit for energizing the relay R, provided switch W is again thrown to its up-position.

As a second step preparing the apparatus to make a vision test, the light of the lamp at 26 is calibrated. To this end, auxiliary push-button switch 110 is first momentarily depressed by the tester to energize the relay R. Current is now supplied directly from trunking conductor 61. When the relay R is thus closed, current to operate the motor M is also supplied from trunking conductor 61 by way of the contact arm pivoted at 71, conductors 630, 511, 510, 62", and switch 91 to the terminal of motor M, the switch 110 being held depressed until the dial shows the hand 30 at its initial position when the motor cam 101 will automatically operate switch 91 to open the motor circuit. To calibrate the intensity of the subject's light, i. e., the light from the lamp 26, the gang-switch through handle 50 is moved to its second position in which each of the contact arms engages with the second terminal on plaques 51 to 57. In this position of the gang-switch, no current is supplied to the glare lights 22. Instead, current is supplied through trunking conductor 66, the contact arm on plaque 54, and conductor 540 to the lamp 26. The light stop disk 25' is now moved by knob 27 to place its largest opening in front of the lamp 26 and the intensity of the light projected on the object 23 is measured by means of the photocell P2 which is now cut into the photocell circuit instead of the cell P1.

The tester now depresses the switch 90 to start the motor M and close the commutator switches 91 to 94, the hold-in switch 92 operating to supply current to the motor M until the relay R closes to supply current directly from the trunking conductor 61 by way of conductor 630. The photocell P2 operates as before when switch 94 closes to charge the condenser 513, which, when charged sufficiently, fires the tube Q so as to energize the relay U and swing the arm pivoted at 111 to open the circuit, deenergizing the relay R. This stops the motor M as before, and the travel of the hand at 30 over the dial is an index of the light intensity projected by the lamp 26 upon the object 23, the proper distance which the hand should travel when light of a desired intensity is projected being known from previous laboratory calibrations. In this instance, it is desired that a light intensity of about 2 foot-candles shall obtain at the object 23. The resistances at 541 and 541' are, of course, adjusted until the desired travel is obtained. When calibration is completed, the apparatus is brought to its desired testing position by depressing push-button switch 110 and starting the motor M to bring hand 30 automatically to its zero position, the switch 91 automatically stopping the motor when this position is obtained.

Variation of the subject's light may be obtained other than by varying the resistances 541 and 541'. This, of course, is achieved by revolving the disk 25' which has various sized holes or lenses which operate to modify the light in desired steps. The light from the lamp 26 may be collected from a small area, for example, an area of ½" x ¾", and projected through an opening in the disk 25' onto an area which may be 6" x 9" for illuminating object 23 and element 24. The openings or diaphragm stops in the disk 25' are preferably a graded series, for example, the stops may be ten in number, ranging in size from 1/64" to ¾". When the first stop is operative the intensity of illumination on object 23 may be less than 1/100 foot-candles while the latter may admit light so as to illuminate the object with an intensity of 2 foot-candles for a given adjustment of the illumination of lamp 26. The collecting area and the object 23 will, of course, be conjugate foci of the lenses of the light stop. When it is desired to know the actual illumination resulting from the use of any one of the light adjustments had from the disk 25', foot-candle-power measurements are made by means of the photocell P2, the intensity being determined by the travel of the hand 30.

To make a test for glare blindness, the gang-switch through its handle 30 is moved to the third position and the stop disk 25' moved to that position, ascertained from the calibration steps, which stops the subject's light down to a value just sufficient to illuminate the object 23 with an intensity making it just visible to the subject when the lamp 26 is on. Current to illuminate the lamp 26 is supplied through conductors 65 and 543 to the arm of the gang-switch and thence by conductor 540, resistances 541 and 541' to the lamp 26 which is grounded. Current for illuminating lamps 22 is supplied in the same manner as when calibrating them, i. e., through the circuit comprising conductors 66, 553 and 550 and resistances 551 and 551' to lamps 22 which are grounded.

Light from the lamps 22 is now projected into the subject's eyes and the blindness produced thereby prevents his seeing the object 23. The tester now rotates the stop disk 25' by manipulating knob 27 to increase the illumination of the object 23 had from the subject's light. The tester also manipulates knob 28 to rotate the element 24 and asks the subject to tell him the direction of the lines thereon as soon as the subject perceives the same. As soon as the subject announces this fact, the correctness of which is verified by the reading of the position of the markings shown by the knob 28, the tester notes the degree in illumination had from lamp 26 in order to get this result. This amount in illumination is taken as a measure of the subject's glare blindness.

To make a test for glare recovery, the gang-switch is moved to the fourth position and the apparatus checked to ascertain that switch 80 is closed and switch 100 is in its up-position. The movement of the gang-switch to the fourth position is seen to extinguish the light from lamps 22 and 26, their illumination being now automatically controlled by the circuits set up by the fourth position of the gang-switch. The subject is again directed to watch for the appearance of the object and to signal when he ascertains the direction of the lines on element 24 by opening switch 80 and announcing the direction of the lines perceived.

The test procedure is started by depressing switch 90. Motor M, in consequence, is started, and the cams 101 to 104 actuate the commutator switches 91 to 94 inclusive. The closing of switch 91 supplies alternating current by way of conductor 510 to operate the motor M. This is seen simultaneously to short circuit rectifier S so that the D. C. component had from the trunking conductor 62 ceases. The motor circuit supplying the A. C. current comprises conductors 61, 61', switch blade 80', conductors 514, 510, 62", switch 91, and motor M, which is grounded. When switch 91 is closed by cam 101, automatic control of the motor M is thereby taken over, which insures its continuous running for the cycle of the test, namely, a period of twenty seconds.

At the instant when the switch 80 is closed, the subject's light 26 is illuminated by means of a circuit comprising conductor 61, the relay arm at 72, conductor 730, switch blade 80'', conductors 544, 540, resistances 541 and 541', and lamp 26, which is grounded. Cam 103 when turned by the motor M causes switch 93 to close for six seconds. While switch 93 is closed, current is seen to energize the relay R through a circuit comprising conductor 64, the fourth terminal on plaque 52, and conductor 520, and thence to the winding e, which is grounded. The energization of winding e causes the relay to close, the arm at 72 swinging away from terminal 73 and breaking the circuit supplying illuminating current to lamp 26 and coming into engagement with terminal 74. In this position, which obtains for the six seconds for which switch 93 is closed, current passes to illuminate the lamps 22 through a circuit comprising conductor 61, terminal 74, conductor 634, the fourth terminal of plaque 55, conductor 550, resistances 551 and 551', and lamps 22, which are grounded. At the end of the six seconds, the relay R is automatically deenergized by the opening of the switch at 93, and the relay arm at 72 falls again into the open relay position engaging terminal 73 to close the circuit which reestablishes the supply of current to the lamp 26. The blindness temporarily produced in the subject's eyes by the glare from lamps 22 prevents his seeing the object at 23 when the lamp at 26 is reilluminated. Motor M, however, continues running and the subject's eyes gradually accommodate themselves to the condition of illumination on the object 23. As soon as the subject sees the object at 23, he opens switch 80. The fact that he actually sees the object can be checked by the correctness of his designation of the direction of the lines on element 24. As soon as switch 80 is opened, it is seen that blade 80' breaks the circuit supplying current to the motor M, its stoppage without overshooting being substantially insured by the D. C. component of current supplied through conductor 62. The period required for recovery from glare can hence be ascertained by the position of indicator hand 30 on the dial. It will be noted that blade 80'' also opens the circuit supplying current to lamp 26 to prevent the subject's seeing the object after he has given the signal and announcing the direction of the lines later ascertained in order to get a better score.

To make a test for movement sensitivity, the gang-switch is retained in its fourth position, but switch 100 is moved to its down-position, the switch 80 being again closed, which illuminates the lamp 29 through the circuit comprising conductors 61, 61', switch blade 80', conductor 614, and lamp 29, which is grounded.

In this test, the subject is instructed to look at the small white body 31 and signal when he perceives its direction of motion by opening switch 80. If lamp 26 is also turned on by this switch, the intensity of light therefrom may be modified by the tester, as desired, by turning knob 27. The tester also moves switch 109 to engage with one or the other of the terminals 107 and 108 which determine the direction in which the motor N revolves and hence that of the movement of the body 31.

When all is in readiness for the test to begin, the tester depresses push-button switch 106. Alternating current to actuate motor N is now supplied, through a circuit comprising conductors 61, 61', switch blade 80', conductors 514 and 510, terminals 83 and 82, by-pass conductor 86, conductor 85', and field winding 87, which is grounded. The closing of the switch 109 permits the passage of out-of-phase current through one portion of the secondary 97 and the shading windings 96, which causes rotation in a desired direction of the armature a and the cam disk 105. This cam disk operates commutator switch 95 to close the main circuit to the windings 87 independently of the by-pass, i. e., from terminal 82 by way of conductor 85, switch 95, and conductor 85'. The rotating armature imparts motion through the gearing at 34 and shaft 33 to the carrier disk 32, which causes body 31 to move slowly. As soon as the subject perceives the direction of motion he opens the switch 80, the switch blade 80' breaking the circuit supplying current to the motor N, the subject announcing the direction of movement which he perceives. The direction announced may be checked by the position of hand 35 on its dial and also by the position of switch 109.

When the motor circuit above described is closed, the circuit of the rectifier S through conductor 84 is shorted so that no D. C. component of current is passed while the motor circuit supplying motor N with running current is closed. Upon the opening of the motor circuit, this short is removed and the D. C. component of current supplied by conductor 62 then passes and brings about the sudden stoppage of motor N, preventing its overshooting. The position of hand 35, in consequence, indicates additionally the period of time required by the subject to ascertain the direction of motion of body 31. This period may be read directly from the dial, provided the hand is on the zero point of the dial at the instant the test began. The reciprocal of this period is taken as a measure of the subject's sensitivity to motion.

To make a test for speed of perception, the gang-switch is moved to its fifth position while the subject is requested to look at the scene through the screen at 15 and watch for an object that may momentarily appear thereon. Both switches V and W are moved to down-positions preparatory to this test. Blade w—3 contacts with the terminal of conductor 581 to effect the discharge of condenser 573 while blade w—4 closes a circuit through the lamp 38 comprising conductors 69, 381, lamp 38, and conductor 382, which is grounded. Lamp 38 illuminates the background scene of plaque 36. The other blades of switch W are seen to be on dead terminals. The switch V in the down-position is seen to set up a circuit for illuminating the lamp 88 and pilot lamp 98, the source of E. M. F. being the secondary source across divider 575. The circuit lighting lamp 88 comprises conductors 67' and 589, switch blade v—2, conductor 586, lamp 88, switch blade v—1, conductor 585, terminal 115, the relay arm pivoted at 112, conductors 584, 673, 671, the switch blade w—2, and conductors 579 and 576 and thence to ground. This circuit is seen also to apply a D. C. potential across the winding of relay U and the tube Q, whose plate element is in series with the relay winding while its cathode is connected to ground by way of conductors 578 and 576. The circuit for lamp 88 is in parallel with that for lamp 88 from switch blade v—1 to blade v—2 by way of conductors 587 and 588. Current passes in the lamp circuits when closed by switches V and W, until the closing of the relay U, which takes place when the tube Q is fired.

The fifth position of the gang-switch sets up a circuit for operating the motor M from current supplied through the hold in switch 92. A circuit through switch 93 is also set up to energize the relay R. The subject's light 26 is also seen to be supplied with current through the circuit including trunking conductor 65.

In this fifth position, circuits for actuating the stop-clock K are also set up. The first of these circuits comprises conductor 70 and running winding 703 which is grounded. Clutch winding 704 when energized causes the hand of the clock to move, this winding being in a circuit tapped into conductor 70 and comprises conductor 701 leading to the fifth terminal of plaque 53, and thence by conductor 530 to terminal 113 of relay U, and thence by conductor 561 to a terminal engageable by blade w—1 of the switch W. From this blade, the circuit is continued by way of conductors 560 and 702 to the clutch winding 704 which is grounded.

The fifth position of the gang-switch also sets up a circuit for the charging of condenser 573 by connecting the conductors 672, 674, and 675 through the fifth terminal on plaque 51 to the conductor 570 which is connected through resistance 571 to the grid of tube Q and in parallel to a terminal of condenser 573 through conductor 572, whereby the condenser may be charged with rectified current from the trunking conductor 67 provided the condenser is not shorted by the switch blade w—3.

If now switch W be thrown to the up-position, clock K starts running and condenser 573 starts charging by reason of the opening of the discharge circuit by the blade w—3. Throwing the switch W to the up-position is seen to extinguish the lamp 88 but momentarily, since, as soon as the blade w—4 reaches the up-position, it establishes contact with another terminal tapped into conductor 69. The background lamp 38 is thus seen to be maintained in an illuminated condition whether the switch W be in up- or down-position.

Current to illuminate the lamp 88 passes simultaneously until the relay closes from the secondary source of E. M. F. across divider 575 through a circuit comprising conductors 87', 589, blade v—2, conductor 586, lamp 88, blade v—1, conductor 585, the relay arm pivoted at 112, conductors 584 and 671, to a terminal adjacent switch blade w—2 of the switch W, and thence by conductor 579 to ground.

The period, for which lamp 88 remains illuminated and for which clock K runs, is determined by the time constant involved in the charging of grid condenser 573, this condenser being charged through the adjustable resistance 674 which has any suitable value, for example, 3 megohms. In such case, the condenser 573 may have capacitance of a value of from .1 to 1 microfarad. When the tube Q fires, the relay U is energized and swings the arms pivoted at 111 and 112 so as to break the clock circuit and the circuit which illuminates lamp 88. While the time for which the lamp 88 is illuminated may be read directly on the dial of the clock K, this period is determined by the setting of the movable tap on the resistance 674. The dial for this resistance on the cabinet may hence be graduated to read time-periods since its various settings determine the period for which the lamp 88 is at any time illuminated. The clock K is thus seen to be needed only for purposes of calibration and is advantageously disconnectably associated with the mechanism of cabinet 10.

The several other circuits set up by the gang-switch in its fifth position are advantageously employed to set and check the position of the hand 30 moved by the motor M in the glare recovery test. For this purpose, the switch 100 is moved to the up-position.

To make this check, push-button switch 90 is depressed to start the motor M. The switch at 90 is seen to supply current through the trunking conductor 63 and the fifth terminal of plaque 51 to the motor M by way of conductor 510 for a period sufficiently long to permit the relay R to close. Current for energizing the relay is supplied through trunking conductor 64 and the six-second switch 93 to the fifth terminal on plaque 52 and thence by way of conductor 520 to energize the relay R and its winding e, which is grounded. Current to continue the running of the motor M is supplied by way of conductors 61 and 630 to the fifth terminal of plaque 51 as soon as the relay closes. Switch 92, which is actuated by cam 102 which has a very short engaging periphery, is seen to open after the closing of the six-second switch 93. The running of the motor continues only as long as the relay R continues closed. When six seconds have elapsed, switch 93 opens and the relay is deenergized. The contact arm pivoted at 71 breaks the motor circuit and the motor M is stopped without overshooting by reason of the D. C. component supplied by way of conductor 62, rectifier S, and switch 100.

To have a direct time reading on the dial traversed by the hand 30 showing accurately the period required for recovery from glare, it is desired that the hand 30 start from the position marked "Zero" at the instant the relay R opens and motor M stops when making this check. In the event that this is not found to be the case, the hand may be adjusted, or, if readings have been previously made, then these may be corrected by the error found by such check.

The test for tunnel vision is administered to the subject while seated at the closed end of the cabinet, the degrees of displacement from the line of vision for sensitivity to objects on the side being read from the scales on the board 41.

To make a test for visual coordination, the subject is seated at some distance from the open end of cabinet 10 and made to look at a point source of light. The Maddox rod is then held before the subject and rotated before one eye and the degrees of image displacement from the meridian noted in the usual manner. If the subject's coordination is perfect, only one point of light is seen at all times. If the subject has a horizontal or vertical imbalance, he will see two points for certain positions of the Maddox rod, and these are noted.

To make a test for depth perception, the subject is moved to the open end of the cabinet and at some distance therefrom asked to name the pins at 45 in the order of their nearness to him when the pins are illuminated. Several scores are generally desirable, made for the subject when at different distances from the cabinet. This illumination may be had from the lamps 18 which also illuminate charts 17. While still seated at this end of the cabinet, the subject is tested for visual keenness and astigmatism for the two eyes separately, in the manner above indicated, by means of the charts at 17; the last test being administered to the subject while seated or standing at the side of the cabinet so as to read the chart at 20. These last tests may be administered to the subject when desired to obtain several scores at different distances from the cabinet.

Thus, by the present procedural steps and the apparatus herein provided, the data and score for subjects as to their several vision sensitivities, which are desired and which may be deemed involved when operating a motor vehicle, are had in a clinical fashion and in a manner psychologically approved.

Since certain changes in carrying out the construction above set forth, which embody the invention, may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. In apparatus for ascertaining a desired set of vision sensitivities of a subject, the combination with a cabinet provided interiorly with means for simulating a field of vision and means under external control for illuminating said field, of index means for indicating the setting of said external control, window means in said cabinet through which the subject may view said field, light generating means for conditioning the subject's eyes, additional means for giving a testing light stimulus, and means for ascertaining the subject's optical reactions.

2. In apparatus for ascertaining a desired set of vision sensitivities of a subject, the combination with a cabinet provided interiorly with an artificial scene simulating conditions that may be encountered in night driving together with means simulating the lights from a subject's vehicle for illuminating said scene, of eye-shield means through which the subject may view said scene, means including an index controlled lamp emitting light adjusted to predetermined intensity simulating a glaring light that may be encountered on a road for producing temporary blindness in the subject's eyes, additional means to be perceived by the subject associated with the scene, means for adjusting the illumination of said additional object, and means for ascertaining the amount of additional illumination required to overcome the subject's temporary blindness.

3. In apparatus for ascertaining a desired set of vision sensitivities of a subject, the combination with a cabinet provided interiorly with an artificial scene simulating conditions encountered when operating a motor vehicle on a highway together with means for illuminating the scene simulating the lights from the subject's vehicle, of eye-shield means through which the subject may view said scene, means for projecting glaring light into the subject's eyes for a period of adjustable length, an additional object associated with said scene to be perceived by the subject, means for illuminating said additional object with light of an intensity that may be varied, and timing means for ascertaining the period required for the subject to overcome the temporary blindness produced by the glaring light projected into his eyes.

4. In apparatus for ascertaining a desired set of vision sensitivities of a subject, the combination with a cabinet provided interiorly with a screen having a scene simulating that obtaining on a highway when operating a motor vehicle at night, of means within said cabinet for projecting light upon said scene to illuminate the same simulating the light from the subject's vehicle, eye-shield means in the cabinet through which the subject may view said scene, index adjusted light projecting means associated with said screen simulating glaring lights from a vehicle on a highway, an additional object associated with said scene in a position to be seen by the subject, a directional element associated with said additional object arranged to be illuminated with said object for checking the subject's perception of the same, means for relatively determining the amount of illumination on said additional object, and means for timing the reaction of the subject's eyes in perceiving said additional object under predetermined conditions of illumination.

5. In apparatus for ascertaining a desired set of vision sensitivities of a subject, the combination with a cabinet provided interiorly with means for simulating a field of vision and means under external control for illuminating said field, of eye-shield means in said cabinet through which the subject may view said field, an object arranged for contrasting illumination on said field, means for imparting relatively slow lateral motion to said object, an index out of the subject's view for showing the direction of said lateral motion, and means for ascertaining the period required by the subject for perceiving the direction of said lateral motion.

6. In apparatus for ascertaining a desired set of vision sensitivities of a subject, the combination with a cabinet provided interiorly with means for simulating a field of vision, of eye-shield means in said cabinet through which the subject may view said field, said field including a relatively dark rotatable disk mounted for movement about an axis horizontally disposed, a relatively small white body mounted on said disk near its periphery, means for imparting relatively slow rotary motion to said disk in either direction, an index out of the subject's view for showing the direction of said lateral motion, and timing means for measuring the period required by the subject to detect the direction of motion imparted to said body.

7. In apparatus for ascertaining a desired set of vision sensitivities of a subject, the combination with a cabinet provided interiorly with means for simulating a field of vision, of eye-shield means in said cabinet through which the subject may view said field, means for placing an object on said field in random positions, index means on the exterior of the cabinet for showing which of said positions is selected, and means for illuminating said field and object for a transitory period of relatively short duration, and means for ascertaining the period for which said illumination obtains.

8. In apparatus for ascertaining a desired set of vision sensitivities of a subject, the combination with a cabinet provided interiorly with means for simulating a field of vision and means under external control for illuminating said field, of eye-shield means in said cabinet through which the subject may view said field, said field including a background scene, a movable discernible object out of said field, and means for projecting said movable discernible object into the subject's field of view, index means on the exterior of said cabinet for showing the position of said discernible object, independent means for illuminating said discernible object for relatively short periods, and means for measuring the period for which said illumination takes place.

9. In apparatus for ascertaining a desired set of vision sensitivities of a subject, the combination with a cabinet provided interiorly with a background scene simulating a condition that may be encountered on a highway, of eye-shield means on said cabinet through which the subject may view said scene, a transparent member disposed in said cabinet obliquely to the line of vision in front of said scene, a rotatable disk in said cabinet having an object whose reflection may be projected by said transparent member into the subject's eyes in a manner such that said object appears to be in said scene, index means on the exterior of said cabinet for controlling and indicating the rotation of said disk, means affording relatively low continuous illumination of said scene, means for transitorily illuminating said object, and means for automatically determining the period for which said transitory illumination takes place.

10. In apparatus for ascertaining a desired set of vision sensitivities of a subject, the combination with a cabinet, of a disk mounted thereon for viewing at a distance and adapted for rotation about the horizontal axis, a plurality of contrasting bodies mounted at various distances from the face of said disk, and index means on the exterior of said cabinet for rotating said disk at will.

11. In apparatus for ascertaining a desired set of vision sensitivities of a subject, the combination with a cabinet provided with a vision testing field to be scanned by the subject, of a background disk rotatably mounted in said cabinet adjacent said field, said disk having a horizontal axle, index means on the exterior of said cabinet for imparting motion at will to said axle, a plurality of objects adapted to be contrastingly illuminated mounted at varying distances from the face of said disk adjacent the periphery thereof, and a common means for illuminating said objects and said field.

12. In apparatus for ascertaining a desired set of vision sensitivities of a subject, the combination with a cabinet provided interiorly with screen means artifically simulating the condition on a highway encountered in the night driving of a motor vehicle, of means in said cabinet for including a lamp projecting light of variable intensity upon said screen in a manner simulating the light from the head-lamps of the subject's vehicle, eye-shield means in said cabinet through which the subject may view said scene, means including a lamp on said screen simulating glaring headlights of a vehicle on a highway, an additional object on said screen adapted for illumination at the side of said glaring headlights, an electric network having switching means controlling the supply of current to said lamps, and a motor connected to actuate said switching means and adapted for timing the reactions of the subject's eyes to the light selectively projected by said lamps.

13. In apparatus for ascertaining a desired set of vision sensitivities of a subject, the combination with a cabinet provided interiorly with a screen artificially simulating conditions encountered on a highway when operating a motor vehicle at night, of a light projector within said cabinet for illuminating said scene having an electric lamp and an adjustable light stop, light projecting means having lamps associated with said screen in a manner simulating a vehicle on a highway at night, an additional object on said screen having an element movable at will arranged for illumination at the side of the light projecting means on said screen, a second screen above the first-named screen having an opening, a light object arranged to be perceived in said opening, a relatively dark disk carrying said object near its periphery, a reversible motor for rotating said carrying disk and imparting slow lateral movement to said object, an electric network for supplying current to said lamps and said reversible motor, switching means for setting up circuits and controlling said lamps and said reversible motor, and a second motor controlling said switching means and timing the periods for which selected lamps are illuminated.

14. In apparatus for ascertaining a desired set of vision sensitivities of a subject, the combination with a cabinet provided interiorly with a screen artificially simulating conditions encountered on a highway when operating a motor vehicle at night, of a light projector within said cabinet for illuminating said scene having an electric lamp and an adjustable light stop, light projecting means having lamps associated with said screen in a manner simulating a vehicle on a highway at night, an additional object on said screen having an element movable at will arranged for illumination at the side of the light projecting means on said screen, a second screen above the first-named screen having an opening, a light object arranged to be perceived in said opening, a relatively dark disk carrying said object near its periphery, a reversible motor for rotating said carrying disk and imparting slow lateral movement to said object, a third screen adjacent said second screen having a tachistoscope comprising a scene and an object transitorily appearing thereon at random, a lamp for illuminating said tachistoscopic object for relatively short determinable periods, an electric network for supplying current to said lamps and said reversible motor, manually operable switching means in said network for setting up circuits coordinating the lighting of lamps and stimuli to be given, automatic switching means for determining the periods for which the lamps and stimuli are to be operated, a second motor for actuating said automatic switching means having means for indicating the periods of time for which it runs, and means for precisely determining the duration of said tachistoscopic illumination.

HARRY R. DE SILVA.